No. 891,536. PATENTED JUNE 23, 1908.
W. E. GOODYEAR.
CHANGE SPEED GEARING.
APPLICATION FILED NOV. 20, 1906.
3 SHEETS—SHEET 1.
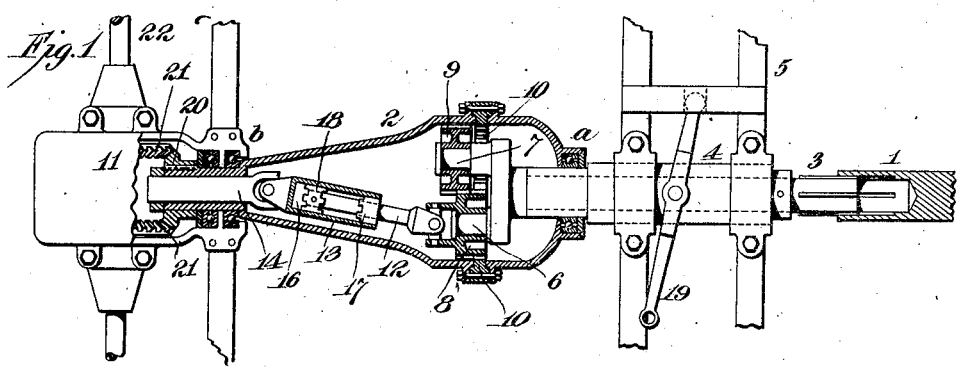
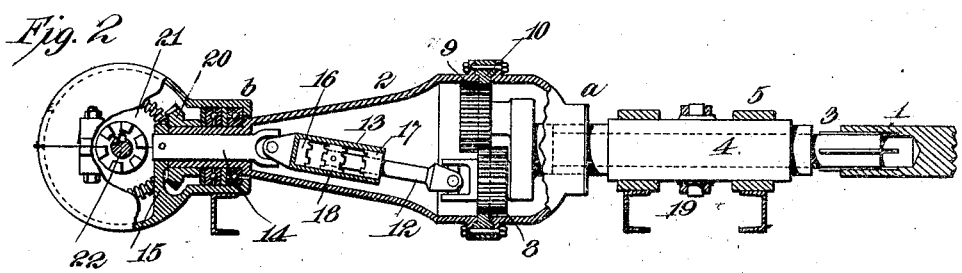
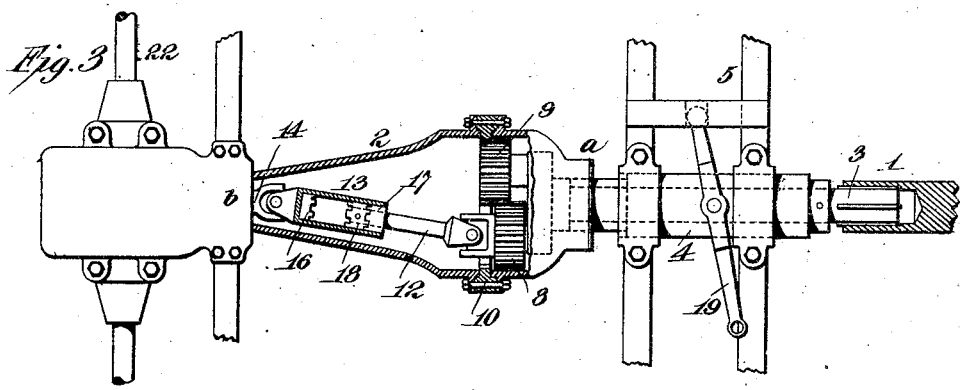
Witnesses:
Jas. F. Coleman
Samuel C. Pearce.
Inventor
William Edward Goodyear
By Dyer & Dyer
Attorneys.

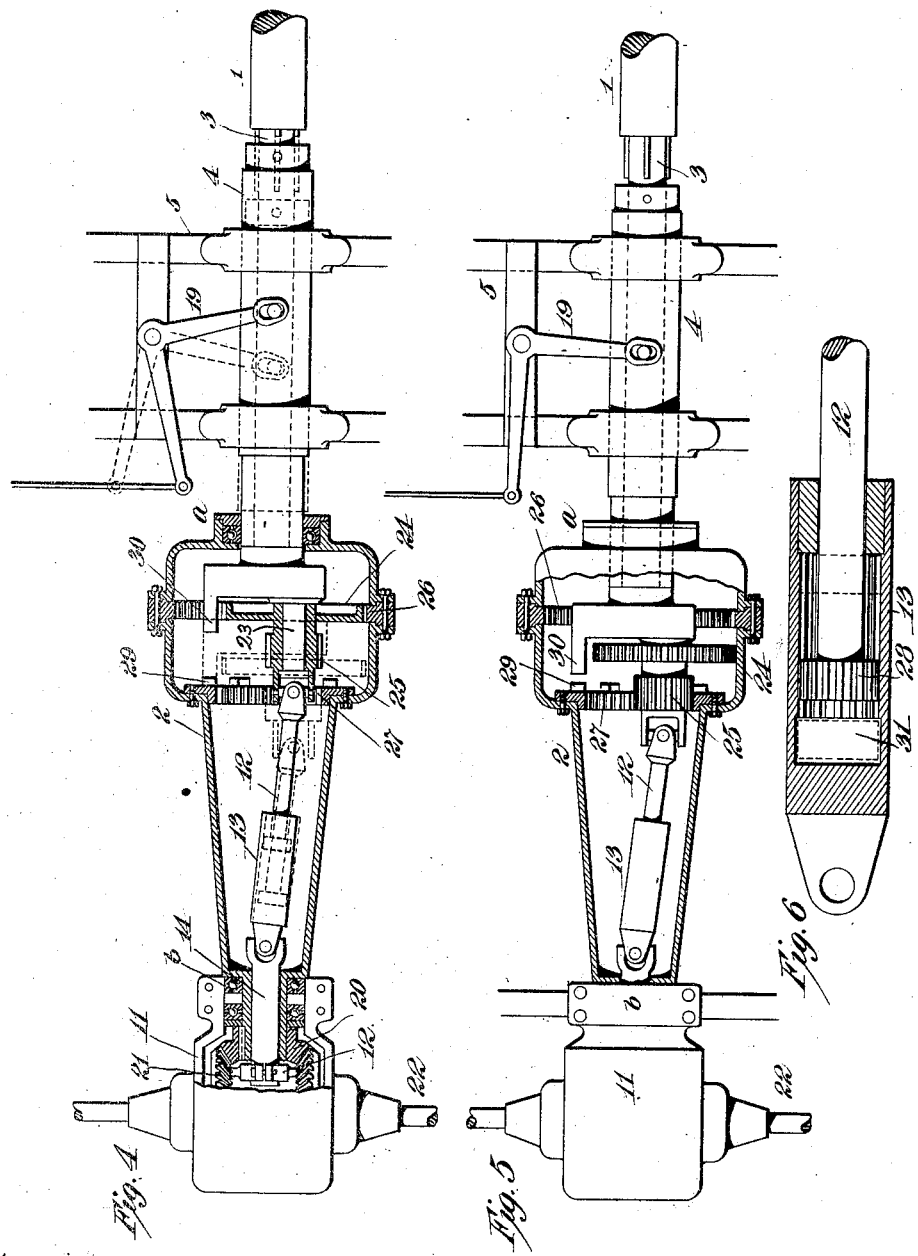

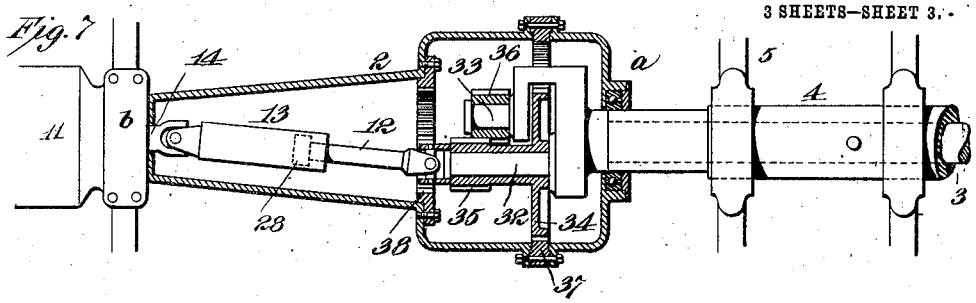
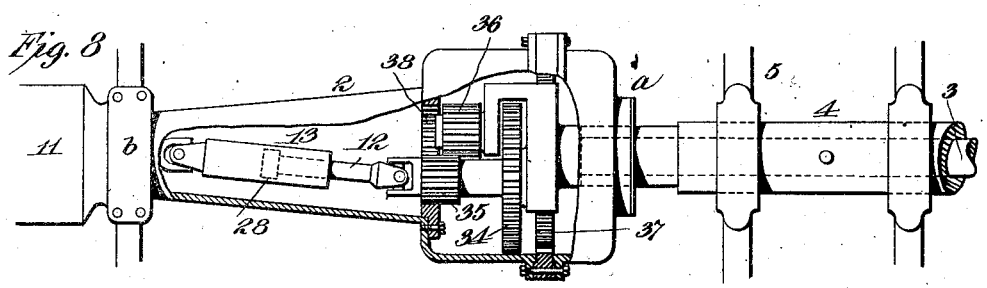
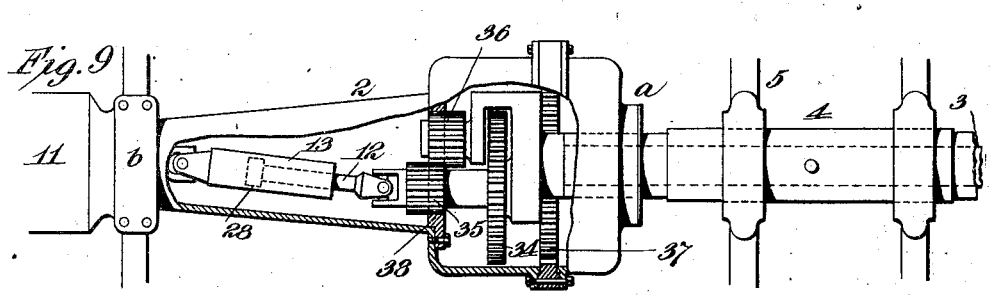
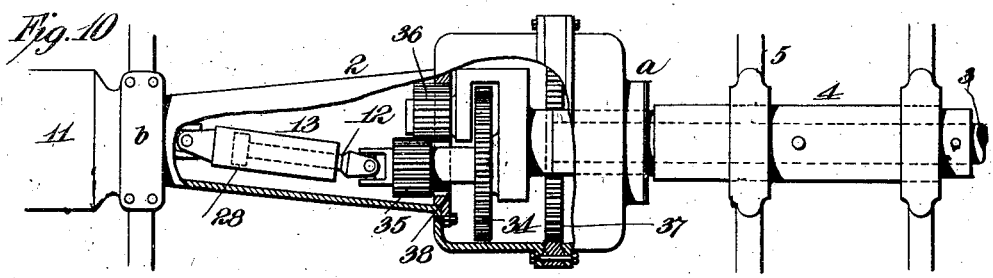
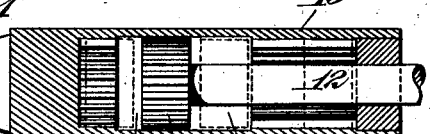

UNITED STATES PATENT OFFICE.

WILLIAM EDWARD GOODYEAR, OF NEWARK, NEW JERSEY.

CHANGE-SPEED GEARING.

No. 891,536.  Specification of Letters Patent.  Patented June 23, 1908.

Application filed November 20, 1906. Serial No. 344,272.

*To all whom it may concern:*

Be it known that I, WILLIAM EDWARD GOODYEAR, a subject of the King of Great Britain and Ireland, and residing in Newark, in the county of Essex, State of New Jersey, have invented a certain new and useful Improvement in Change-Speed Gearing, of which the following is a specification.

The object I have in view is the production of a change speed gearing of very simple construction and which renders possible a number of speed changes with a smaller number of gears than has hitherto been used.

The invention is particularly applicable to the driving gears of automobiles, but it is not restricted to such use, as it may be used in any situation where it is desirable to secure a plurality of speed changes driven through a positive gearing.

I attain the objects of my invention by the mechanism illustrated in the accompanying drawings, in which Figure 1 is a longitudinal section of the essential parts of a gear embodying my invention, showing the relative position of the parts to secure the first or slow speed, Fig. 2 is a view of the same but at right angles thereto, showing the position of the parts when driving at the second or intermediate speed, Fig. 3 is a view similar to Fig. 1, showing the position of the parts at the third or highest speed, Figs. 4 and 5 are modifications of the gear shown in the first three views, Fig. 4 illustrating the position of the parts at the slow speed in solid line and at high speed in the broken line, and Fig. 5 showing the position of the parts in the intermediate or second speed, Fig. 6 is an enlarged view of the clutch portion of the gyrating member, Figs. 7, 8, 9 and 10 show another modification of the invention which secures four speeds, Fig. 7 showing the parts in the position they assume at the first or slow speed, Fig. 8, at the second or intermediate speed, Fig. 9, at the third, and Fig. 10 at the fourth or highest speed; Fig. 11 is an enlarged sectional view of the clutch which forms a portion of the gyrating member.

In all the views, like parts are designated by the same reference letters.

Referring first to Figs. 1, 2 and 3, the shaft 1 is the driving member and the casing 2 the driven member. The shaft 3 is slidably splined into the shaft 1 so that it will rotate therewith but may be longitudinally moved in relation thereto. The shaft 3 rotates within a sliding sleeve or bearing 4 which is held against longitudinal movement on the shaft by collars, as shown. The sleeve 4 is carried in bearings in the frame 5. The head of the shaft 3 carries two studs 6 and 7, upon which are mounted gears 8 and 9 intermeshed with each other, which are also adapted to intermesh with an internal gear 10 which is carried by, or forms a portion of, the driven member 2. The driven member may be of skeleton form but is preferably a hollow casing, as shown, so that it will serve as an oil retainer. It has one bearing at $a$ upon the bearing sleeve 4 and another bearing at $b$ upon the frame or casing 11. The studs 6 and 7 are placed off the center of the shaft so that the centers of the studs and the centers of the gears 8 and 9 will rotate in a circular orbit of a size depending upon the distance of the centers of the studs from the center of the shaft 3. The hub of the gear 8 is connected to, or forms a portion of, a universal joint connecting it with the shaft 12. The shaft 12 slides and rotates within a sleeve 13, which is connected to a shaft 14 by a second universal joint. The shaft 14 is keyed or tightly clamped in a bracket 15, Fig. 2, which bracket may be a part of the frame 11, so that the shaft 14 and the sleeve 13 cannot revolve. A clutch member 16 is fixed in one end of the sleeve 13 and a clutch member 17 is fixed in the other end, both of the clutch members having their teeth facing each other. The member 17 is bored for the shaft 12 so that it may slide through and rotate in it. A double ended clutch member 18 is fixed on the end of the shaft 12 between the two members 16 and 17, so that as the shaft 12 is slid in or out the member 18 will engage either of the members 16 or 17. When the member 18 engages either of the members 16 or 17 the shaft 12 and gear 8 cannot rotate, but they have a gyrating movement.

An operating lever 19 serves to move the sleeve 4 and with it the shaft 3, gears 8 and 9 and shaft 12 to different positions depending on the position of the lever 19. The end of the casing 2 within the frame 11 is shown as provided with a beveled gear 20 which engages with two beveled gears 21. These beveled gears are mounted upon a shaft 22 which may be the rear shaft or the sprocket-wheel shaft of an automobile or any other power absorbing device. In connection with an automobile, the two gears 21, 21 may be loosely mounted upon the shaft 22 and they may be connected thereto, by means of a clutch, in any well known manner, so that rotary motion in both directions may be given to the shaft 22. Any known mechanism for this purpose may be used.

Fig. 1 shows the position of the parts for securing the low speed gear. The clutch member 18 is caused to engage with the clutch member 16. This is caused by the movement of the lever 19 sliding the shaft 3. The same movement will cause the gear 8 to mesh with the internal gear 10 and the gear 9 to unmesh or disengage with such gear. As the shaft 3 revolves, the stud 6 will carry the gear 8 around with a gyrating movement, the gear being locked against rotary movement by the clutch members 16 and 18. By gyrating movement I mean an orbital movement of a member around a center, without movement around its own axis. In the example illustrated, this gear has half as many teeth as the gear 10. Therefore the gear 10 and driven member 2 are rotated in the same direction as the shaft 3 but at half its speed. In this position the gear 9 freely rotates upon its supporting stud 7 as an idler, as it is not in mesh with the gear 10. The two gears 8 and 9 are of such width that they can be mounted in the staggered position shown and will always be in mesh. The gear 10 is of less width than the face of the gears 8 and 9.

Fig. 2 shows the parts moved to a position for the second or intermediate speed, and in this position the clutch member 18 lies intermediate the clutch members 16 and 17 and does not engage with either, but, on the contrary, is free to revolve within the sleeve 13. In this position, both of the gears 8 and 9 are in mesh with the internal gear 10. This locks the three gears together and they act as a clutch so that the shaft 3 and driven member 2 rotate together at the same speed, as one solid piece, making a direct drive. In this position there are no gears rotating but the clutch member 18 will rotate within the sleeve 13.

Fig. 3 shows the parts in the position they assume to drive at the high speed. Here the member 18 engages the member 17 again, causing the parts 12 and 13 to have a gyrating movement. The gear 9 is in mesh with the gear 8. The gear 8, partaking of a gyrating but not a rotary movement, will cause the gear 9 to rotate at the same speed as the shaft 3 and in the same direction at the same time it is carried around bodily by the stud 7, thereby driving the internal gear 10 and driven member 2 at one and a half times the speed of the driving member.

In the gearing shown in Figs. 1, 2 and 3, three speeds are secured with but three gears; no other gearing has been heretofore produced driving at three speeds with only three gears.

Figs. 4, 5 and 6 illustrate a form of the device which will give three speeds with the use of four gears. In this arrangement, the shaft 3 is mounted in the sliding bearing 4, as before, and is connected to the driven member 2 in the same manner. In this modification, the head of the shaft 3 has but one stud 23 which is arranged to one side of the longitudinal center of the shaft 3. Upon this stud 23 are gears 24 and 25 somewhat analogous to the gears 7 and 8, already described. The driven member 2 has internal gears 26 and 27. The gears 23 and 24 may be made in one piece or both fixed on the same hub or otherwise arranged so as to turn together. The shaft 12 is connected to turn in time with the gears by a universal joint, as before described. The shaft 12 has an enlargement at its other end upon which are splines or teeth 28 which engage with internal splines or teeth on the inside of the sleeve 13. The inside end of the shaft 14 is clamped to the casing 11, as already described, the clamp in this case having two arms which are bent around out of the way of the bevel gears 21, 21.

In Fig. 4 the gear 24 is shown in mesh with the internal gear 26 and with the teeth or splines 28 on the shaft 12 in engagement with the internal teeth on the sleeve 13, so that the gears 24 and 25 cannot rotate but gyrate as the shaft 2 is rotated. The internal gear 26 is shown as having one-quarter more teeth than the gear 24. Therefore the driven member 2 will revolve at one-quarter the speed of the driving member.

Fig. 5 shows the parts so moved that the gear 24 is out of mesh with the internal gear 26 and the gear 25 is in mesh with the internal gear 27. The teeth or splines 28 of the shaft 12 still engage with the internal teeth on the sleeve 13 so that the gear 25 still has the gyrating movement and cannot rotate. As shown, the gear 25 has half as many teeth as the gear 27, so that the driven member will rotate at half the speed of the driving member which will produce the intermediate gear.

The internal gear 27 is provided with lugs or teeth 29 on one side. A lug 30 is provided on the end of the shaft 3, the said lug being so arranged as to clear the gear 24. By sliding the parts further to the left the clutch teeth on the shaft 12 go out of engagement with the internal teeth on the sleeve 13 and into a clearance space 31, so that the shaft 12 can freely rotate within the sleeve 13. At the same time the lug 30 will be brought into engagement with the lugs 29, making a direct drive at the high speed. The position of the parts is shown in the broken line in Fig. 4. This form of gear has an advantage over that shown in the first three figures in that the high speed is the speed of the driving member and is not higher than the driving member. It is open to the objection of having four gears and only three speeds.

The gearing shown in Figs. 7 to 11, inclusive, is intended to secure four speeds, with five gears, the highest speed being higher than the speed of the driving member, and the third speed being at the same speed as the driving member. In this modification, the shaft 3 carries two studs 32 and 33, two gears 34 and 35 (these gears being mounted upon the stud 32) and a gear 36 on the stud 33. The driven member 2 is provided with an internal gear 37 and a smaller internal gear 38. The shaft 12 is provided with splines or teeth 28, as described in connection with the preceding modification. The sleeve 12 is somewhat different from that illustrated in Fig. 6 as it has internal teeth or splines at both ends and a clearance space 39 about midway. The gears 35 and 36 always intermesh and these gears have wide faces similar to the gears 8 and 9 in the first embodiment of the invention. The supporting stud 33 for the gear 36 is bent or curved around the gear 34, as shown.

Fig. 7 shows the parts in position with the gear 34 in mesh with the internal gear 37. At the same time the teeth 28 upon the shaft 12 are in engagement with the internal gears on the sleeve 13, so that the gear 34 will gyrate but will not rotate, and in the proportion of gears illustrated, will drive the driven member 2 at one-quarter of the speed of the driving shaft 3.

In Fig. 8, the parts are moved to a position where the gear 34 is unmeshed from the gear 37 but the gear 35 meshes with the internal gear 38. The shaft 12 is still locked with the internal splines on the sleeve 13. Consequently the gear 35 cannot rotate but is forced to gyrate. The gear 35 is shown as having half the number of teeth as the internal gear 38; consequently the driven member moves at half speed. At these two speeds the gear 36 will act as an idler, as it will not engage with either of the internal gears. It engages only with the gear 35.

In Fig. 9, the parts are moved to a position in which both the gears 35 and 36 are in mesh with the internal gear 38. This locks all of the gears in the same manner as shown in Fig. 2, at the same time the teeth 28 on the shaft 12 are in the clearance space 39, so that the shaft 12 is free to rotate within the sleeve 13. In this position, the shaft 3 being locked to the driven member 2, will give a direct drive for the third speed.

In Fig. 10, the parts are moved to the position where only the gear 36 is in mesh with the internal gear 38 and the clutch teeth 28 on the shaft 12 are again in mesh with the internal splines or teeth on the sleeve 13 beyond the idle space 39. In this position the action is the same as that illustrated in Fig. 3, and the driven member revolves one and a half times the speed of the driving member, thus constituting the fourth speed.

It is to be understood that it is not necessary to use gears of the ratio shown, such being for the purpose of illustration.

The invention may be modified in many ways, those shown being solely for the purpose of illustration.

The form of clutch used upon the gyrating member, it is to be understood, is not limited to the structure shown in the drawing. The form of clutch shown in Figs. 6 and 11 may be used in place of that shown in Figs. 1, 2 and 3 without departing from the spirit of my invention.

In accordance with the provisions of the patent statutes, I have described the principle of my invention together with the apparatus which I now consider to represent the best embodiment thereof; but I desire to have it understood that the apparatus shown is merely illustrative and that the invention can be carried out in other ways.

I claim as my invention:—

1. A gearing having in combination a driving member, a driven member, and means for positively transmitting the motion of the driving member to the driven member at different speeds, such means containing an element which travels in a circular path without rotating on its own axis.

2. A gearing having in combination a driving member, a driven member, and means for positively transmitting the motion of the driving member to the driven member at different speeds, such means containing an element which travels in a circular path without rotating on its own axis, and an element that rotates.

3. A change speed gearing containing positive means to obtain as many changes of speed as it contains gears, the axes of such gears being a fixed distance apart.

4. A change speed transmission gearing containing a driving member and a driven member, with positive means to drive the driven member at as many different speeds as there are gears and having all gears arranged at fixed distances between centers, there being means to connect the driving member to the driven member to drive without change of speed.

5. A change speed gearing containing a shaft, and stud thereon off the center line thereof, a gear mounted upon such stud, a gyrating part connected to the gear, an internal gear adapted to be intermeshed with the first gear and means for sliding the stud-supported gear into and out of engagement with the internal gear, and means for preventing rotation of the gyrating part.

6. A gearing having in combination a driving member, a driven member, and means for positively transmitting the motion of the driving member to the driven member at different speeds, such means containing a toothed gear which travels in a circular path without rotating on its own axis.

This specification signed and witnessed this nineteenth day of November, 1906.

WILLIAM EDWARD GOODYEAR.

Witnesses:
LEONARD H. DYER,
JNO. ROBT. TAYLOR